(12) United States Patent
Kwak

(10) Patent No.: US 9,961,577 B2
(45) Date of Patent: *May 1, 2018

(54) METHOD AND APPARATUS OF COMMUNICATING A BEACON REPORT

(71) Applicant: INTEL CORPORATION, Santa Clara, CA (US)

(72) Inventor: Joseph A. Kwak, Hawkesbury (CA)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/457,621

(22) Filed: Mar. 13, 2017

(65) Prior Publication Data

US 2017/0188251 A1 Jun. 29, 2017

Related U.S. Application Data

(63) Continuation of application No. 14/588,437, filed on Jan. 1, 2015, now Pat. No. 9,668,157, which is a (Continued)

(51) Int. Cl.
*H04W 24/10* (2009.01)
*H04W 24/08* (2009.01)
(Continued)

(52) U.S. Cl.
CPC .......... *H04W 24/08* (2013.01); *H04W 24/10* (2013.01); *H04W 48/14* (2013.01); *H04W 84/12* (2013.01)

(58) Field of Classification Search
CPC ..... H04W 24/08; H04W 24/10; H04W 48/14; H04W 84/12
See application file for complete search history.

(56) References Cited

U.S. PATENT DOCUMENTS 4,541,095 A 9/1985 Vries et al.
5,517,674 A 5/1996 Rune
(Continued)

FOREIGN PATENT DOCUMENTS

CA 2525837 12/2004
EP 1067812 1/2001
(Continued)

OTHER PUBLICATIONS

First Examination Report for Indian Patent Application No. 4964/DELNP/2005, dated Jan. 22, 2009, 2 pages.
(Continued)

*Primary Examiner* — Phuc Tran
(74) *Attorney, Agent, or Firm* — Shichrur & Co.

(57) ABSTRACT

A beacon signal may be provided with data extensions. The data extensions permit additional information to be provided by the beacon signal, thereby reducing the traffic overhead of the network. The data extensions further permit handoffs and handoffs based on offset values. A Measurement Request field corresponding to a beacon request contains a measurement duration value and channel number for which the request applies. The beacon request permits a scan mode. In Active Scan mode, the measuring station (STA) transmits a probe request with a broadcast SSID. In Passive Scan mode, the measuring STA passively receives on the specified channel and return a beacon report containing one information element for each STA from which it detects a beacon or probe response. In Beacon Table mode, the measuring STA returns a beacon report containing the current contents of its beacon table without performing additional measurements.

34 Claims, 3 Drawing Sheets

Related U.S. Application Data continuation of application No. 13/572,087, filed on Aug. 10, 2012, now Pat. No. 9,332,451, which is a continuation of application No. 12/763,360, filed on Apr. 20, 2010, now Pat. No. 8,265,051, which is a continuation of application No. 10/845,822, filed on May 14, 2004, now Pat. No. 7,710,930.

(60) Provisional application No. 60/470,256, filed on May 14, 2003.

(51) Int. Cl.
*H04W 48/14* (2009.01)
*H04W 84/12* (2009.01)

(56) References Cited

U.S. PATENT DOCUMENTS

| | | | |
|---|---|---|---|
| 5,692,031 A | 11/1997 | Sharp et al. | |
| 5,697,055 A | 12/1997 | Gilhousen et al. | |
| 5,815,811 A | 9/1998 | Pinard et al. | |
| 6,181,943 B1 | 1/2001 | Kuo et al. | |
| 6,259,898 B1 | 7/2001 | Lewis | |
| 6,445,917 B1 | 9/2002 | Bark et al. | |
| 6,563,460 B2 | 5/2003 | Stilp et al. | |
| 6,621,804 B1 | 9/2003 | Holtzman et al. | |
| 6,636,738 B1 | 10/2003 | Hayashi | |
| 6,636,983 B1 | 10/2003 | Levi | |
| 6,697,013 B2 | 2/2004 | McFarland et al. | |
| 6,747,964 B1 | 6/2004 | Bender | |
| 6,768,719 B1 | 7/2004 | Couaillet | |
| 6,771,934 B2 | 8/2004 | Demers et al. | |
| 6,826,395 B2 | 11/2004 | Lee et al. | |
| 6,865,609 B1 | 3/2005 | Gubbi et al. | |
| 6,873,611 B2 | 3/2005 | Rios | |
| 6,882,851 B2 | 4/2005 | Sugar et al. | |
| 6,934,554 B2 | 8/2005 | Mizuno et al. | |
| 6,958,982 B2 | 10/2005 | Rudolf et al. | |
| 6,985,465 B2 | 1/2006 | Cervello et al. | |
| 6,990,428 B1 | 1/2006 | Kaiser et al. | |
| 7,003,290 B1 | 2/2006 | Salonaho et al. | |
| 7,010,267 B2 | 3/2006 | Vanluijt et al. | |
| 7,133,398 B2 | 11/2006 | Allen et al. | |
| 7,158,759 B2 | 1/2007 | Hansen et al. | |
| 7,206,840 B2 | 4/2007 | Choi et al. | |
| 7,499,701 B2 * | 3/2009 | Salonaho | H04W 36/30 455/423 |
| 7,620,405 B2 * | 11/2009 | Soomro | H04W 24/00 370/322 |
| 7,710,930 B2 * | 5/2010 | Kwak | H04W 48/14 370/328 |
| 8,265,051 B2 * | 9/2012 | Kwak | H04W 48/14 370/328 |
| 9,332,451 B2 * | 5/2016 | Kwak | H04W 48/14 |
| 9,668,157 B2 * | 5/2017 | Kwak | H04W 48/14 |
| 9,736,763 B2 * | 8/2017 | Kneckt | H04W 48/16 |
| 2002/0060995 A1 | 5/2002 | Cervello et al. | |
| 2002/0172186 A1 | 11/2002 | Larsson | |
| 2002/0176388 A1 | 11/2002 | Rankin et al. | |
| 2002/0188723 A1 | 12/2002 | Choi et al. | |
| 2003/0040319 A1 | 2/2003 | Hansen et al. | |
| 2003/0063619 A1 | 4/2003 | Montano et al. | |
| 2003/0214905 A1 | 11/2003 | Solomon et al. | |
| 2003/0224797 A1 | 12/2003 | Kuan et al. | |
| 2004/0006705 A1 | 1/2004 | Walker | |
| 2004/0008627 A1 | 1/2004 | Garg et al. | |
| 2004/0039817 A1 | 2/2004 | Lee et al. | |
| 2004/0103278 A1 | 5/2004 | Abhishek et al. | |
| 2004/0120292 A1 | 6/2004 | Trainin | |
| 2004/0165563 A1 | 8/2004 | Hsu et al. | |
| 2004/0176024 A1 | 9/2004 | Hsu et al. | |
| 2004/0185845 A1 | 9/2004 | Abhishek et al. | |
| 2005/0171720 A1 | 8/2005 | Olson et al. | |
| 2006/0013179 A1 | 1/2006 | Yamane | |
| 2006/0050742 A1 | 3/2006 | Grandhi et al. | |
| 2006/0084390 A1 | 4/2006 | Salonaho et al. | |
| 2006/0218271 A1 * | 9/2006 | Kasslin | H04L 43/06 709/224 |
| 2007/0258365 A1 | 11/2007 | Das et al. | |
| 2009/0264141 A1 | 10/2009 | Green et al. | |
| 2012/0307663 A1 | 12/2012 | Kwak | |
| 2015/0109951 A1 | 4/2015 | Kwak | |

FOREIGN PATENT DOCUMENTS

| | | |
|---|---|---|
| EP | 1257092 | 11/2002 |
| EP | 1276344 | 1/2003 |
| JP | 07203517 | 8/1995 |
| KR | 20030017618 | 3/2003 |
| WO | 9829957 | 7/1998 |
| WO | 9943178 A1 | 8/1999 |
| WO | 1999043178 | 8/1999 |
| WO | 0171981 | 9/2001 |
| WO | 02093839 | 11/2002 |
| WO | 2003077482 | 9/2003 |
| WO | 2004100468 | 11/2004 |
| WO | 2004104737 | 12/2004 |
| WO | 2006097832 | 9/2006 |

OTHER PUBLICATIONS

Hearing Notice for Indian Patent Application No. 4964/DELNP/2005, dated Mar. 6, 2013, 2 pages.
Examiner's Report for Canadian Patent Application No. 2,820,104, dated Mar. 20, 2014, 5 pages.
Search and Examination Report for Norwegian Patent Application No. 20055955, dated Oct. 21, 2010, 5 pages, including 2 pages of partial English translation.
Office Action for Norwegian Patent Application No. 20055955, dated Oct. 20, 2012, 4 pages, including 2 pages of partial English translation.
Examination Report for Norwegian Patent Application No. 20055955, dated Mar. 27, 2012, 4 pages, including 2 pages of partial English translation.
Reexamination Notice for Chinese Patent Application No. 200910005364.8, dated Mar. 5, 2014, 12 pages, including 7 pages of English translation.
Office Action & Search Report for Taiwanese Patent Application No. 100105695, dated May 22, 2014, 13 pages, including 5 pages of English translation.
Second Reexamination Notice for Chinese Patent Application No. 200910005364.8, dated Jul. 25, 2014, 6 pages, including 3 pages of English translation.
Non-Final Office Action for U.S. Appl. No. 12/763,360, dated Nov. 12, 2010, 6 pages.
Non-Final Office Action for U.S. Appl. No. 12/763,360, dated Jan. 20, 2012, 6 pages.
Notice of Allowance for U.S. Appl. No. 12/763,360, dated Mar. 22, 2011, 5 pages.
Notice of Allowance for U.S. Appl. No. 12/763,360, dated Jul. 9, 2012, 5 pages.
Non-Final Office Action for U.S. Appl. No. 10/845,822, dated Dec. 28, 2007, 7 pages.
Non-Final Office Action for U.S. Appl. No. 10/845,822, dated Oct. 14, 2008, 6 pages.
Notice of Allowance for U.S. Appl. No. 10/845,822, dated Apr. 3, 2009, 6 pages.
Notice of Allowance for U.S. Appl. No. 10/845,822, dated Nov. 16, 2009, 6 pages.
Draft Supplement to Standard for Telecommunications and Information Exchange Between Systems—LAN/MAN Specific Requirements—Part 11: Wireless Medium Access Control (MAC) and physical layer (PHY) specifications: Specification, for Radio Resource Measurement. IEEE Std 802.11k/D0.1, Mar. 2003, 32 pages.
Draft Supplement to Standard for Telecommunications and Information, Exchange Between Systems—LAN/MAN Specific Requirements—Part 11: Wireless, Medium Access Control (MAC) and physical layer (PHY) specifications: Specification for Radio

(56) References Cited

OTHER PUBLICATIONS

Resource Measurement. IEEE Std 802.11k/D0.2, May 2003, 57 pages.
IEEE Wireless LAN Edition: A Compilation Based on IEEE Standard 802.11-1999 (R2003) and its Amendments, published Sep. 19, 2003, 706 pages.
Cervello, G et al: "Dynamic Channel Selection (DCS) Scheme for 802.11". IEEE 802.11-00/195, Jul. 12, 2000, 7 pages.
IEEE Std 802.11-1997 Information Technology—Telecommunications and Information Exchange Between Systems—Local and Metropolitan Area Networks—Specific Requirements—Part 11: Wireless LAN Medium Access Control (MAC) and Physical Layer (PHY) Specifications. IEEE Std. 802.11-1997, Jun. 26, 1997, 459 pages.
Moreton, Mike. "Comment Resolution Motions." IEEE 802.11-03/169r1, Mar. 2003, 16 pages.
Soomro et al. "Measurement/Quiet Request Element for DFS in TGH," IEEE 802.11-02/215r0, Mar. 2002, 12 pages.
3GPP TS 25.331 V3.18.0 (Mar. 2004); Technical Specification; 3rd Generation Partnership Project; Technical Specification Group Radio Access Network; Radio Resource Control (RRC) protocol specification (Release 1999); Mar. 2004, 883 pages.
3GPP TS 25.331 V3.14.0 (Mar. 2003); Technical Specification; 3rd Generation Partnership Project; Technical Specification Group Radio Access Network; Radio Resource Control (RRC) protocol specification (Release 1999); Mar. 2003, 859 pages.
3GPP TS 25.331 V4.9.0 (Mar. 2003); Technical Specification; 3rd Generation Partnership Project; Technical Specification Group Radio Access Network; Radio Resource Control (RRC); Protocol Specification (Release 4); Mar. 2003; 932 pages.
3GPP TS 25.331 V4.13.0 (Mar. 2004); Technical Specification; 3rd Generation Partnership Project; Technical Specification Group Radio Access Network; Radio Resource Control (RRC); Protocol Specification (Release 4); Mar. 2004; 954 pages.
3GPP TS 25.331 V5.8.0 (Mar. 2004); Technical Specification; 3rd Generation Partnership Project; Technical Specification Group Radio Access Network; Radio Resource Control (RRC); Protocol Specification (Release 5); Mar. 2004; 1030 pages.
3GPP TS 25.331 V6.1.0 (Mar. 2004); Technical Specification; 3rd Generation Partnership Project; Technical Specification Group Radio Access Network; Radio Resource Control (RRC); Protocol Specification (Release 6); Mar. 2004; 1032 pages.
ETSI TS 125 331 V5.4.0 (Mar. 2003), Technical Specification, Universal Mobile Telecommunications System (UMTS); Radio Resource Control (RRC) protocol specification (3GPP TS 25.331 version 5.4.0 Release 5), Mar. 2003, 986 pages.
Holma et al. "WCDMA for UMTS, The Radio Resource Control Protocol," John Wiley and Sons, pp. 135-151 (Jan. 2001), 17 pages.
Kaaranan et al. "UMTS Networks: Architecture, Mobility and Services," pp. 6-13, 50-57, 71-99, and 181-207. (Jun. 2001), 73 pages.
Office Action for Korean Patent Application No. 10-2012-7021250, dated Oct. 17, 2012, 8 pages, including 4 pages of English translation.
English Translation of Notice of Preliminary Rejection for Korean Patent Application No. 10-2012-7021250, dated Aug. 29, 2013, 2 pages.
Final Notice of Preliminary Rejection for Korean Patent Application No. 10-2012-7021250, dated Jul. 29, 2014, 4 pages, including 1 page of English translation.
English Translation of Final Notice of Preliminary Rejection for Korean Patent Application No. 10-2012-7009593, dated Feb. 14, 2013, 1 page.
Notice of Allowance for Korean Patent Application No. 10-2012-7009593, dated Aug. 27, 2013, 3 pages, including 1 page of English translation.
Office Action for Korean Patent Application No. 10-2011-7028428, dated Feb. 13, 2012, 19 pages, including 4 pages of English translation.
English Translation of Office Action for Korean Patent Application No. 10-2011-7028428, dated May 30, 2012, 5 pages.
Notice of Allowance for Korean Patent Application No. 10-2011-7028428, dated Nov. 28, 2012, 3 pages, including 1 page of English translation.
Examiner's Report for Canadian Patent Application No. 2,820,104, dated Sep. 24, 2014, 2 pages.
Office Action for Korean Patent Application No. 2012-7021250, dated Nov. 25, 2014, 5 pages, including 2 pages of English translation.
Office Action for European Patent Application No. 08168068.8, dated Oct. 27, 2011, 7 pages.
Office Action for European Patent Application No. 10179384.2, dated Dec. 6, 2011, 6 pages.
International Search Report and Written Opinion for International Patent Application No. PCT/US2004/014901, dated Jul. 6, 2005, 4 pages.
Office Action for Chinese Patent Application No. 200910005364.8, dated Jul. 6, 2011, 12 pages, including 7 pages of English translation.
Office Action for Chinese Patent Application No. 200910005364.8, dated Mar. 8, 2010, 10 pages, including 6 pages of English translation.
Office Action for Chinese Patent Application No. 200910005364.8, dated May 3, 2012, 17 pages, including 8 pages of English translation.
Office Action for Chinese Patent Application No. 200910005364.8, dated Nov. 1, 2011, 12 pages, including 7 pages of English translation.
Office Action for Brazilian Patent Application No. PI0411180-0, dated Mar. 13, 2017, 6 pages.
International Preliminary Report on Patentability and Written Opinion for International Patent Application No. PCT/US2004/014901, dated Nov. 18, 2005, 7 pages.
Re-Examination Decision for Chinese Patent Application No. 200910005364.8, dated Dec. 10, 2014, 22 pages, including 12 pages of English translation.
Extended European Search Report for European Patent Application No. 08168068.8, dated Jan. 30, 2009, 9 pages.
Office Action for European Patent Application No. 10154548.1, dated Dec. 6, 2011, 6 pages.
Extended European Search Report for European Patent Application No. 10154548.1, dated May 6, 2010, 9 pages.
Extended European Search Report for European Patent Application No. 10179384.2, dated Feb. 4, 2011, 9 pages.
Supplementary European Search Report for European Patent Application No. 04752031.7, dated May 17, 2006, 2 pages.
International Preliminary Report on Patentability for International Patent Application No. PCT/US04/14901, dated Sep. 12, 2006, 19 pages.
Office Action for U.S. Appl. No. 13/572,087, dated Dec. 19, 2013, 8 pages.
Final Office Action for U.S. Appl. No. 13/572,087, dated Oct. 31, 2014, 11 pages.
Office Action for U.S. Appl. No. 13/572,087, dated May 28, 2014, 7 pages.
Office Action in European Application No. 08 168 068.8, dated Oct. 15, 2015, 7 pages.
Office Action in European Application No. 10 154 548.1, dated Nov. 10, 2015, 4 pages.
Office Action in Canadian Application No. 2,820,104, dated Oct. 30, 2015, 3 pages.
Office Action for U.S. Appl. No. 14/588,437, dated Feb. 26, 2016, 36 pages.
Office Action for Korean Patent Application No. 2015-7007456, dated Jun. 22, 2015, 7 pages (Including 3 pages of English translation).
Ericsson. "UE Measurement Concept for Intra-Frequency Measurements", TTSG-RAN Working Group 2 (Radio layer 2 and Radio layer 3), TSGR2#4(99)419 Berlin, Germany, May 25-28, 1999, 11 pages.
Office Action for U.S. Appl. No. 14/588,437, dated Mar. 11, 2016, 9 pages.

(56) References Cited

OTHER PUBLICATIONS

Court Decision for Chinese Patent Application No. 200910005364.8, dated Dec. 31 2015, 24 pages (Including 11 pages of English translation).
Office Action for Taiwanese Patent Application No. 103,137,414, dated Jan. 12 2016, 8 pages (Including 4 pages of English translation).
Office Action for European Patent Application No. 10179384.2, dated Jan. 27 2016, 5 pages.
Office Action for U.S. Appl. No. 141588,437, dated Aug. 4, 2016, 17 pages.
Office Action for Indian Patent Application Serial No. 517/DELNP/2010, dated Jun. 10, 2016, 6 pages.
Office Action for European Patent Application No. 10179384.2, dated Jan. 12, 2017, 4 pages.
Office Action for Canadian Patent Application No. 2926855, dated Mar. 9, 2017, 3 pages.
Notice of Allowance for U.S. Appl. No. 14/588,437, dated Dec. 2, 2016, 11 pages.
Office Action for European Patent Application No. 10179384.2, dated Jan. 25, 2018, 4 pages.

\* cited by examiner

METHOD AND APPARATUS OF COMMUNICATING A BEACON REPORT

CROSS REFERENCE TO RELATED APPLICATION(S)

This application is a Continuation application of U.S. patent application Ser. No. 13/572,087, filed on Aug. 10, 2012, which is a Continuation application of U.S. patent application Ser. No. 12/763,360, filed on Apr. 20, 2010, which in turn is a Continuation application of U.S. patent application Ser. No. 10/845,822, filed on May 14, 2004, which claims the benefit and priority of U.S. Provisional Application No. 60/470,256, filed on May 14, 2003, all of which are hereby incorporated by reference.

FIELD OF INVENTION

This invention relates to beacon measurement request signals used in wireless slotted communications and network management. More particularly, the invention relates to network management using periodic measurements of parameters such as new beacon received power level or signal quality.

BACKGROUND

The IEEE 802.11 communications protocol allows a client to roam among multiple access points that may be operating on the same or separate channels. IEEE 802.11 communications are generally effected through wireless LAN access points (APs), which are typically single stand-alone units, but can include networks with multiple APs which provide a roaming function. To support the roaming function, each access point typically transmits a beacon signal every 100 ms. A roaming station (STA) uses the beacon to gauge the strength of its existing access point connection. If the STA senses a weak signal, the roaming STA can implement the reassociation service to connect to an access point emitting a stronger signal.

IEEE 802.11 supports two power modes; active and power-saving (PS). The protocols for infrastructure networks and ad hoc networks are different. Under an infrastructure network, there is an AP to monitor the mode of each mobile station. A station in the active mode is fully powered and thus may transmit and receive at any time. On the contrary, a station in the PS mode only wakes up periodically to check for possible incoming packets from the AP. A station always notifies its AP when changing modes. Periodically, the AP transmits beacon frames spaced by a fixed beacon interval. A PS station should monitor these frames. In each beacon frame, a traffic indication map (TIM) are delivered, which contains IDs of those PS stations with buffered unicast packets in the AP. A PS station, on hearing its ID, should stay awake for the remaining beacon interval. Under the contention period (i.e., DCF), an awake PS station can issue a PS-POLL to the AP to retrieve the buffered packets. While under the contention-free period (i.e., PCF), a PS station waits for the AP to poll it. The AP sends delivery TIMs (DTIMs) within beacon frames to indicate that there are buffered broadcast packets. The delivery TIMs are spaced by a fixed number of beacon intervals. Immediately after DTIMs, the buffered broadcast packets are sent.

Since IEEE 802.11 presumes that mobile stations are fully connected, the transmission of a beacon frame can be used to synchronize all stations' beacon intervals. In addition to the use in IEEE 802.11, beacon signals are useful in other WLAN communications and wireless communications in general. Periodic measurements are performed in systems implementing the third generation partnership program (3GPP) wideband code division multiple access (W-CDMA) system. Such systems use a time division duplex mode. To support higher layer functions in IEEE 802.11 standards for efficient network management, several physical parameters relating to different aspects of network management are desirable.

One such parameter is the perceived signal to noise indicator (PSNI), the measurement of which provides a quantized, comparative measure of received signal quality for all channels/rates and among all physical channels and between all stations. Another parameter is the received channel power indicator (RCPI) indicator, which is a measure of the received RF power in the selected channel, measured at the antenna connector. The RCPI parameter may be a measure by the PHY sub layer of the received RF power in the channel measured over the PLCP preamble and over the entire received frame. RCPI is a monotonically increasing, logarithmic function of the received power level defined in dBm. The exemplary allowed values for the RCPI parameter may be an 8-bit value in the range from 0 through 220.

In known approaches, the measurement of the parameters RCPI and PSNI is done as a single measurement, which approach has certain disadvantages. It is desirable to provide an improved method of making measurements of the parameters, e.g., RCPI and PSNI, to result in specific advantages resulting in more efficient network management.

SUMMARY

According to the present invention, periodic measurements of the new beacon request are used in order to support roaming and dynamic data rate adjustment, and related functions. The concepts for periodic measurements are performed in a manner analogous to periodic measurements in systems implementing third generation partnership program (3GPP) wideband code division multiple access (W-CDMA) system utilizing the time division duplex mode.

DETAILED DESCRIPTION OF THE PREFERRED EMBODIMENTS

Figure 1:
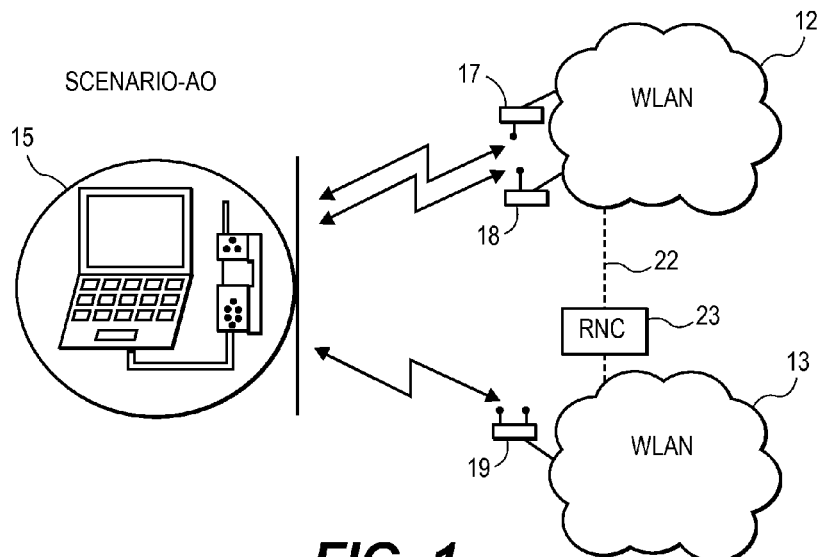
FIG. 1 is a schematic diagram of a network configuration in which WLANs communicate with a wireless transmit/receive unit (WTRU) through one or more access points.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, an access point includes but is not limited to a Node B, site controller, access point or any other type of interfacing device in a wireless environment.

An "access point" (AP) in a typical IEEE 802.11 implementation is a station or device which provides wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network.

Network management by making measurements of parameters, e.g., RCPI and PSNI, is performed periodically rather than in the manner of a one-time measurement. The impact of making periodic measurements on the network performance and the attendant benefits are addressed in the description of the preferred embodiment. More specifically, the beneficial effect of making periodic measurements on the beacon request extensions to support roaming and dynamic data rate are addressed. Even though the invention is described in the specific context of the standard IEEE 802.11 as an example, the invention is envisaged to be applicable to other scenarios also.

Periodic beacon requests are made during connection between a WTRU and an AP on a WLAN. A Measurement Request field corresponding to a beacon request contains a measurement duration value and channel number for which the request applies. The beacon request permits a scan mode which includes "Active Scan" mode, "Passive Scan" mode and "Beacon Table" mode. In Active Scan mode, the measuring station (STA) transmits a probe request with a broadcast service station identifier (SSID). The measuring STA's beacon report contains one information element for each STA from which it detects a beacon or probe response, regardless of whether the probe response was triggered by the measuring STA's own probe request. In Passive Scan mode, the measuring STA passively receives on the specified channel and returns a beacon report containing one information element for each STA from which it detects a beacon or probe response. If the measuring channel is also the serving channel, the STA concurrently carries out its normal data traffic operation. In Beacon Table mode, the measuring STA returns a Beacon Report containing the current contents of its beacon table without performing additional measurements. The Measurement Duration field is set equal to the duration of the requested measurement, expressed in time units (TUs).

The following are some potential advantages of periodic measurements as compared with the single measurement approach:

Periodic measurements reduce management traffic: single measurement request produces multiple reports but only when relevant.

Absolute Threshold crossings on PSNI measures are ideal to trigger data rate changes.

Absolute Threshold crossings on RCPI are ideal for proximity detectors for location.

Relative Threshold with respect to serving AP detects conditions for handoff.

The beacon request also contains periodic extensions (information fields) which specify periodic beacon measurements. The extensions fields are used to provide parameters for the periodic measurement and conditional reporting of measurement results. These provide periodic measurements which reduce management traffic, such that a single measurement request produces multiple reports. The multiple reports are provided only when deemed relevant. Absolute threshold crossings on perceived signal to noise indicator (PSNI) may be used as a condition to provide a measurement report. The measurements on PSNI are suitable to trigger data rate changes. Absolute threshold crossings on received channel power indicator (RCPI) may be used as a condition to provide a measurement report.

The periodic extensions are additional fields in the beacon request which are use for periodic beacon measurements. The capability to do periodic measurements is an optional capability for the AP, and therefore APs which are not capable of doing periodic beacon measurements will ignore the periodic extensions. A beacon request is a request to perform a measurement. A beacon report is the response containing the result(s) of the requested beacon measurement.

The absolute threshold crossings are suitable for proximity detectors used to determine location and approximate position relative to an AP. A relative threshold with respect to a serving AP is used to detect conditions for a handoff.

The measurement request field corresponding to a beacon request is shown in Table 1 and contains the measurement duration and channel number for which the request applies. Also included in Table 1 are the extensions (additional information fields) needed to specify periodic measurements and conditional reporting. Table 1 generally shows the measurement request field format for a beacon request. The illustration for the current measurement shows the number of octets for the channel number, channel band, measurement duration and scan mode. Table 1 also shows for comparison, the octets for periodic extensions, with respect to basic service set identifier (BSSID), measurement period, reporting condition, threshold/offset, and hysteresis effect. More particularly, the Measurement Request field corresponding to a beacon request is shown in Table 1 and contains the measurement duration and channel number for which the request applies. A response to a beacon request is a beacon report.

TABLE 1

| Beacon Request | | | | |
|---|---|---|---|---|
| | Channel Number | Channel Band | Measurement Duration | Scan Mode |
| Octets: | 1 | 1 | 2 | 1 |
| | BSSID | Measurement Period | Reporting Condition | Threshold/ Offset | Hysteresis |
| Octets | 6 | 2 | 1 | 1 | 1 |

If the AP is not capable of performing periodic measurements and thus does not recognize the extensions, then the AP ignores the extensions and provides a single measurement and a single report.

In Table 1, channel number indicates the channel number on which the requesting STA instructs the receiving STA to report detected beacons and probe responses. In the beacon request, the Channel Number field indicates the channel number on which the requesting STA instructs the receiving STA to report detected beacons and probe responses. The Channel Band field indicates the frequency band, taken from Table 1, in which the receiving STA conducts its measurement. The Scan Mode field is set to the type of scan, according to Table 2 (infra). The scanning behavior is as follows:

In Active Scan mode, the measuring STA transmits a probe request with the broadcast SSID. The measuring STA's beacon report contains one information element for each STA from which it detects a beacon or probe response, regardless of whether the probe response was triggered by the measuring STA's own probe request In Passive Scan mode, the measuring STA passively receives on the specified channel and return a beacon report containing one information element for each STA from which it detects a beacon or probe response. If the measuring channel is also the serving channel, the STA concurrently carries out its normal data traffic operation.

In Beacon Table mode, the measuring STA returns a beacon report containing the current contents of its beacon table without performing additional measurements.

The Measurement Duration field is set equal to the duration of the requested measurement, expressed in TUs.

Tables 2 and 3 show channel band definitions for radio measurement requests and Scan Mode definitions for beacon request elements.

TABLE 2

Channel Band definitions for radio measurement requests

| Name | Channel Band |
|---|---|
| 2.4-GHz Band | 0 |
| 5-GHz Band | 1 |

TABLE 3

Scan Mode definitions for Beacon Request elements

| Name | Scan Mode |
|---|---|
| Passive Scan | 0 |
| Active Scan | 1 |
| Beacon Table | 2 |
| Reserved | 3-255 |

BSSID indicates the BSSID of the particular AP for which this measurement is requested. The BSSID specifies which AP to measure when several APs are detectable on a given channel. The BSSID is set to the broadcast BSSID when the measurement is performed on any AP(s) on this channel. A broadcast BSSID is used when an AP BSSID is unknown.

The Measurement Period indicates whether this measurement is a single measurement event or is a periodic measurement which is repeated each Measurement Period. The Measurement Period is divided into two subfields: Unit and Period. The Unit subfield defines the time unit for the Period subfield and consists of the 2 MSBs with the following values:

The Period subfield consists of the 14 LSBs and is an unsigned integer number representing the repeating time interval for this periodic measurement. A Period subfield value of 0 indicates that the measurement is not periodic but is a single measurement. A period subfield value of 16383 (3FFF Hex) indicates that the measurement is periodic with no requested measurement period; in this case the measurement is performed on a best effort basis and as frequently as conditions permit.

The Reporting Condition defines when the measured results are reported to the requesting STA. The Reporting Condition values are defined in Table 4.

TABLE 4

Reporting Condition Definitions for Beacon Request Element

| Condition Description | Reporting Condition |
|---|---|
| Report to be issued after each measurement. | 0 |
| Report to be issued when the RCPI level of the measured AP crosses above an absolute threshold with hysteresis. | 1 |
| Report to be issued when the RCPI level of the measured AP crosses below an absolute threshold with hysteresis. | 2 |
| Report to be issued when the PSNI level of the measured AP crosses above an absolute threshold with hysteresis. | 3 |
| Report to be issued when the PSNI level of the measured AP crosses below an absolute threshold with hysteresis. | 4 |
| Report to be issued when the RCPI level of the measured AP crosses above a threshold defined by an offset (with hysteresis) from the serving AP's RCPI. | 5 |
| Report to be issued when the RCPI level of the measured AP crosses below a threshold defined by an offset (with hysteresis) from the serving AP's RCPI. | 6 |
| Report to be issued when the PSNI level of the measured AP crosses above a threshold defined by an offset (with hysteresis) from the serving AP's PSNI. | 7 |
| Report to be issued when the PSNI level of the measured AP crosses below a threshold defined by an offset (with hysteresis) from the serving AP's PSNI. | 8 |
| Periodic reports (one per measurement) to begin when the RCPI level of the measured AP enters and remains in a range bound by the serving AP's RCPI and an offset (with hysteresis) from the serving AP's RCPI. | 9 |
| Periodic reports (one per measurement) to begin when the PSNI level of the measured AP enters and remains in a range bound by the serving AP's PSNI and an offset (with hysteresis) from the serving AP's PSNI. | 10 |
| Reserved | 11-255 |

Threshold/Offset provides either the threshold value or the offset value to be used for conditional reporting. A threshold value is an unsigned 8 bit integer having units which are equivalent to PSNI or RCPI. An offset value is a signed 7 bit integer in the range of (−127, +127).

Hysteresis provides an unsigned 8 bit integer hysteresis value having units equivalent to the units used in the Threshold/Offset field.

FIG. 1 is a schematic diagram of a network configuration 11 in which one or more WLANs 12, 13 communicate with a WTRU 15 through one or more APs 17-19. In the example depicted the WLANs 12, 13 are able to establish a network link 22, either directly or through a radio network controller (RNC) 23.

Figure 2:
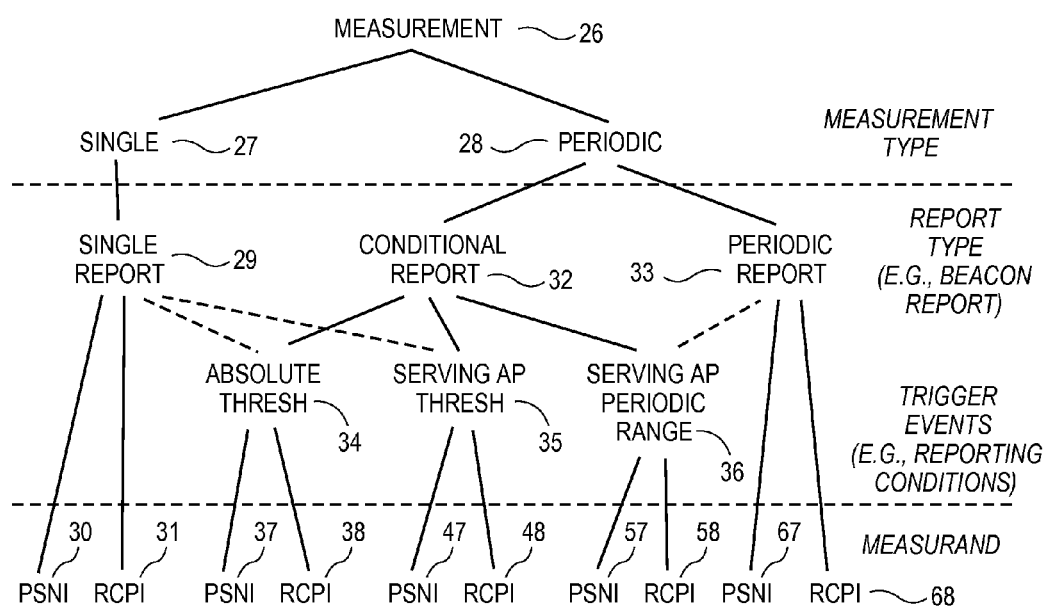
FIG. 2 is a chart showing types of measurements or reports.

FIG. 2 is a chart showing types of measurements or reports, showing how event detection triggers a report, or, triggers periodic reporting. More specifically, FIG. 2 illustrates for comparison, a single report scenario for PSNI and RCPI, as compared to similar periodic conditional reports for absolute threshold, serving AP threshold, serving AP periodic range. Also illustrated is the periodic reporting for each trigger event for comparison. The broadest category is a measurement 26. As used here, "measurement" can be a measurement or report. The measurement 26 may be a single 27 or periodic 28 measurement. A single measurement generates a single report 29, which includes a single report PSNI 30 and a single report RCPI 31. The periodic measurement 28 can generate a conditional report 32 or a periodic report 33. The conditional report 32 can provide an absolute threshold 34, a serving AP threshold 35 or a serving AP periodic range 36. The absolute threshold 34 includes an absolute threshold PSNI 37 and an absolute threshold RCPI 38. The serving AP threshold 35 includes a serving AP threshold PSNI 47 and a serving AP threshold RCPI 48. The serving AP periodic range 36 includes a serving AP periodic range PSNI 57 and a serving AP periodic range RCPI 58. The periodic report 33 includes a periodic report PSNI 67 and a periodic report RCPI 68.

In addition, the single report 31 may be conditionally reported based on an absolute threshold 34 including absolute threshold PSNI 37 and absolute threshold RCPI 38. Also, the single report 31 may be conditionally reported based on the serving AP threshold 35 including serving AP threshold PSNI 47 and serving AP threshold RCPI 48. The serving AP periodic range is not used for the single report 31, but may provide the serving AP periodic range 36 including serving AP periodic range PSNI 57 and serving AP periodic range RCPI 58 for periodic measurement reporting.

The single and periodic measurements 27, 28 are measurement types. The single report 31, conditional report 32, periodic report The absolute threshold 34, serving AP threshold 35 and serving AP periodic range 36 trigger events. The measurement results are the single report PSNI 27, single report RCPI 28, absolute threshold PSNI 37, absolute threshold RCPI 38, serving AP threshold PSNI 47, serving AP threshold RCPI 48, serving AP periodic range PSNI 57, serving AP periodic range RCPI 58, periodic report PSNI 67 and periodic report RCPI 68. For conditional reporting, event detection triggers one or more of these single event reporting outputs or periodical reporting outputs.

Figure 3:
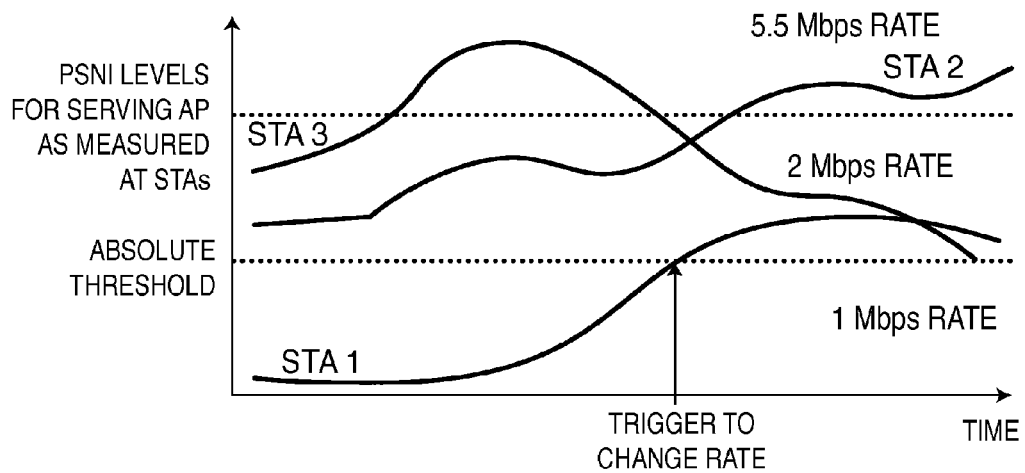
FIG. 3 is a graph showing the effects of absolute threshold on data rate selection.

FIG. 3 is a graph showing the effects of absolute threshold on data rate selection, and illustrates variation of measurement quantity against time for three different channels having 5.5 Mbps, 2.0 Mbps and 1.0 Mbps rates respectively. At an initial time of the graph, STA 1 receives a low PSNI level from the AP as measured at the STA, substantially below an absolute threshold. The rate is established at 1 Mbps. STA 2 and STA 3 have PSNI levels above the threshold level. As time progresses, STA 3 has received PSNI levels which exceed a second threshold and then drops down to below the absolute threshold. STA 3 thus can change to the 5.5 Mbps rate, but must drop down to the 2 Mbps rate and eventually the 1 Mbps rate as the PSNI level drops. STA 2 remains at the 2 Mbps rate until later, when STA 2 has sufficient PSNI levels to change to the 5.5 Mbps rate. These changes in PSNI levels can also be used to change APs by selecting the AP with a higher rate or PSNI level, should resources from that AP be available.

Figure 4:
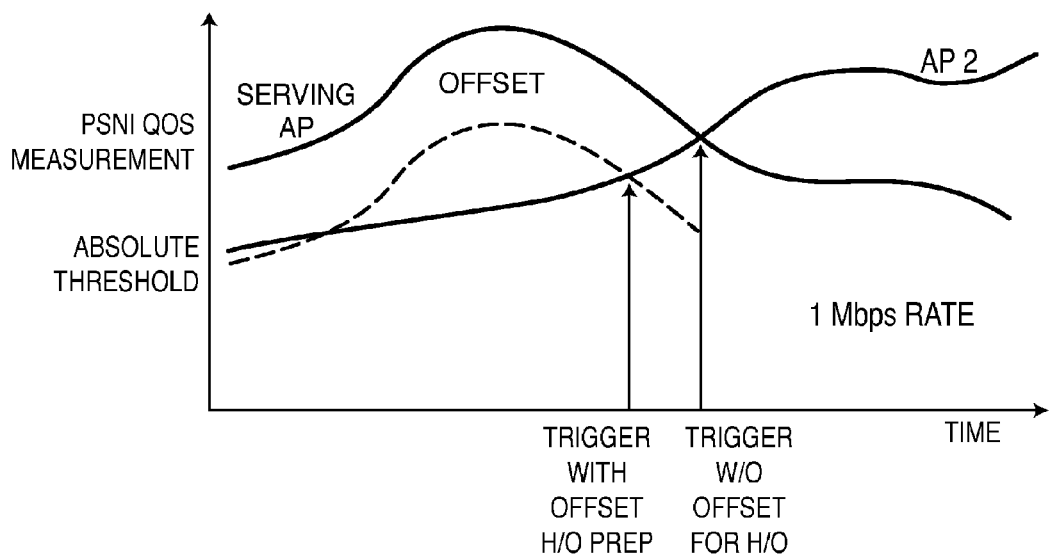
FIG. 4 is a graph showing a relative threshold which uses the serving AP for a handoff.

FIG. 4 is a graph showing a relative threshold which uses the serving AP for a handoff. This figure also illustrates variation of measurement quantity against time for AP 1 and AP 2 intersecting at a location showing the reporting event. The graph shows the signals received by a STA from a first AP (Serving AP) and a second AP (AP 2). The measurement for the servicing AP is made lower by an offset, in which PSNI is made lower, in order to favor AP 2. Thus the measurement of PSNI for the serving AP is made artificially lower by the offset. This causes an early trigger of the handoff as a result of the offset.

Figure 5:
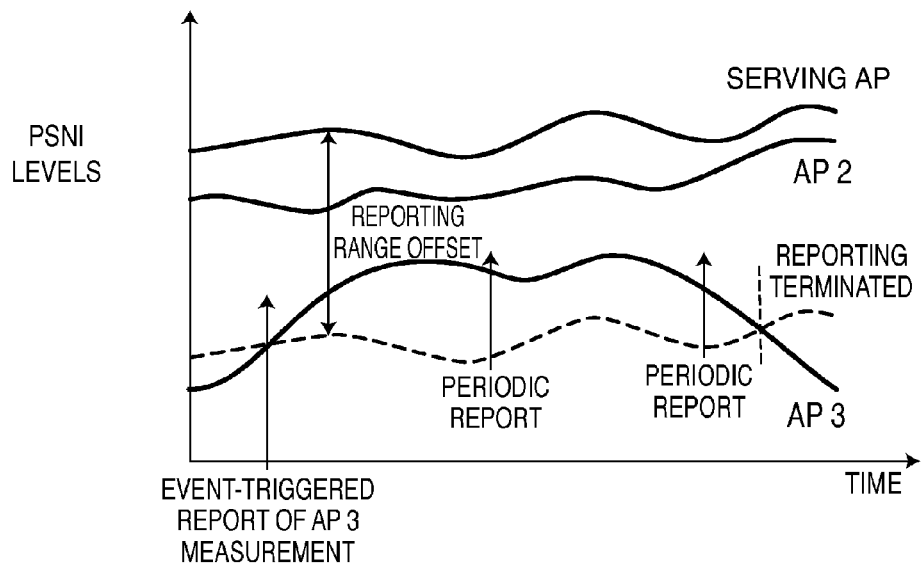
FIG. 5 is a graph showing the effect of a reporting offset.

FIG. 5 is a graph showing the effect of a reporting offset and shows relative threshold triggers for AP 1, 2 and 3 showing the reporting range and when the reporting terminates. The graph illustrates timeslot ISCP versus time showing the ISCP threshold and the reporting event. Event triggered and periodic reports of the PSNI levels each show the instance of a reduced PSNI level as a result of the offset. The reporting of the serving AP 3 continues during a peak period of PSNI reported from a third AP, AP 3, but discontinues when the signal from AP 3 drops below the offset reporting of PSNI from the serving AP.

Figure 6:
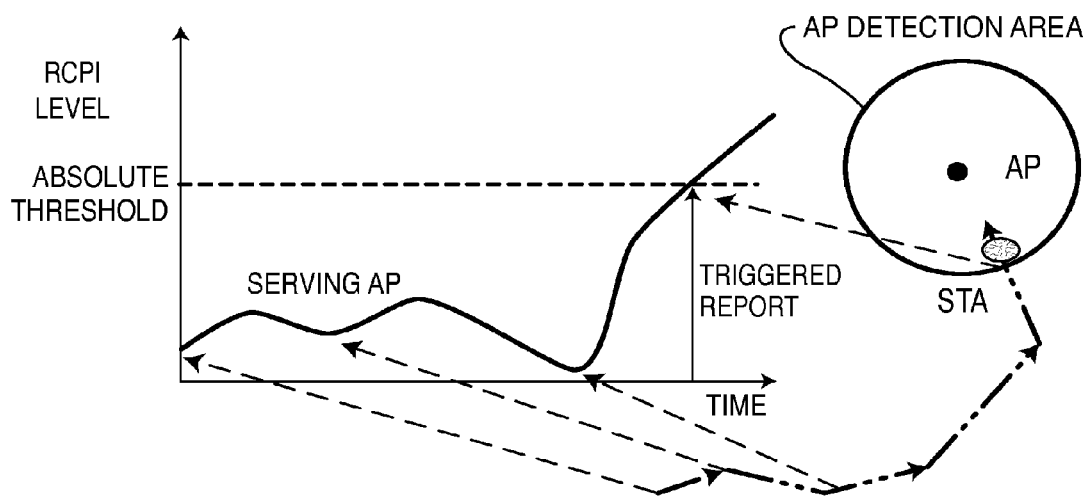
FIG. 6 is a graph showing the received channel power indicator (RCPI) level of a serving AP.

FIG. 6 is a graph showing the RCPI level of a serving AP. The triggering event here is an absolute threshold exceeded. The triggering event triggers a report.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. An apparatus comprising:
    a receiver to receive from a wireless communication station a beacon request comprising a measurement request field, the measurement request field comprising a measurement duration field and a mode field, the measurement duration field to indicate a measurement duration of a requested measurement; and
    a transmitter to transmit a beacon report to the wireless communication station based on the measurement request field,
    wherein, when the mode field comprises an active mode value or a passive mode value, the beacon report comprises a report based on detection, according to the measurement duration, of one or more of probe responses or beacons, and, when the mode field comprises a beacon table mode value, the beacon report comprises a current content of beacon information without additional measurement.

2. The apparatus of claim 1, wherein, when the mode field comprises the active mode value, the transmitter is to broadcast a probe request.

3. The apparatus of claim 1, wherein the measurement request field comprises a channel number field comprising one octet to indicate a channel for the requested measurement.

4. The apparatus of claim 1, wherein the measurement request field comprises a Basic Service Set Identifier (BSSID) field comprising six octets to indicate a BSSID for the requested measurement.

5. The apparatus of claim 1, wherein the passive mode value comprises a value of "0", the active mode value comprises a value of "1", and the beacon table mode value comprises a value of "2".

6. The apparatus of claim 1, wherein the measurement duration field comprises two octets to indicate the measurement duration in Time Units (TU).

7. The apparatus of claim 1, wherein, when the measurement request field comprises a zero reporting condition value, the transmitter is to transmit the beacon report after each measurement.

8. The apparatus of claim 1, wherein, when the measurement request field comprises a non-zero reporting condition value, the transmitter is to transmit the beacon report based on a condition represented by the non-zero reporting condition value.

9. The apparatus of claim 1 comprising an antenna.

10. A method to be performed by a first wireless communication station, the method comprising:
    receiving from a second wireless communication station a beacon request comprising a measurement request field, the measurement request field comprising a measurement duration field and a mode field, the measurement duration field to indicate a measurement duration of a requested measurement; and
    transmitting a beacon report to the second wireless communication station based on the measurement request field, wherein, when the mode field comprises an active mode value or a passive mode value, the beacon report comprises a report based on detection, according to the measurement duration, of one or more of probe responses or beacons, and, when the mode field comprises a beacon table mode value, the beacon report comprises a current content of beacon information without additional measurement.

11. The method of claim 10 comprising, when the mode field comprises the active mode value, broadcasting a probe request.

12. The method of claim 10, wherein the measurement request field comprises a channel number field comprising one octet to indicate a channel for the requested measurement.

13. The method of claim 10, wherein the measurement request field comprises a Basic Service Set Identifier (BSSID) field comprising six octets to indicate a BSSID for the requested measurement.

14. The method of claim 10, wherein the passive mode value comprises a value of "0", the active mode value comprises a value of "1", and the beacon table mode value comprises a value of "2".

15. The method of claim 10, wherein the measurement duration field comprises two octets to indicate the measurement duration in Time Units (TU).

16. The method of claim 10 comprising, when the measurement request field comprises a zero reporting condition value, transmitting the beacon report after each measurement.

17. The method of claim 10 comprising, when the measurement request field comprises a non-zero reporting condition value, transmitting the beacon report based on a condition represented by the non-zero reporting condition value.

18. An apparatus comprising:
a transmitter to transmit to a wireless communication station a beacon request comprising a measurement request field, the measurement request field comprising a measurement duration field and a mode field, the measurement duration field to indicate a measurement duration of a requested measurement, the mode field comprising a value selected from a plurality of predefined values comprising at least an active mode value, a passive mode value and a beacon table mode value, the active mode value and the passive mode value to indicate a request for a report based on detection, according to the measurement duration, of one or more of probe responses or beacons, the beacon table mode value to indicate a request for a current content of beacon information without additional measurement; and
a receiver to receive a beacon report from the wireless communication station based on the measurement request field.

19. The apparatus of claim 18, wherein the active mode value is to indicate to the wireless communication station to broadcast a probe request.

20. The apparatus of claim 18, wherein the measurement request field comprises a channel number field comprising one octet to indicate a channel for the requested measurement.

21. The apparatus of claim 18, wherein the measurement request field comprises a Basic Service Set Identifier (BSSID) field comprising six octets to indicate a BSSID for the requested measurement.

22. The apparatus of claim 18, wherein the passive mode value comprises a value of "0", the active mode value comprises a value of "1", and the beacon table mode value comprises a value of "2".

23. The apparatus of claim 18, wherein the measurement duration field comprises two octets to indicate the measurement duration in Time Units (TU).

24. The apparatus of claim 18, wherein the measurement request field comprises a zero reporting condition value to indicate transmission of the beacon report after each measurement.

25. The apparatus of claim 18, wherein the measurement request field comprises a non-zero reporting condition value to indicate transmission of the beacon report based on a condition represented by the non-zero reporting condition value.

26. The apparatus of claim 18 comprising an antenna.

27. A method comprising:
transmitting to a wireless communication station a beacon request comprising a measurement request field, the measurement request field comprising a measurement duration field and a mode field, the measurement duration field to indicate a measurement duration of a requested measurement, the mode field comprising a value selected from a plurality of predefined values comprising at least an active mode value, a passive mode value and a beacon table mode value, the active mode value and the passive mode value to indicate a request for a report based on detection, according to the measurement duration, of one or more of probe responses or beacons, the beacon table mode value to indicate a request for a current content of beacon information without additional measurement; and
receiving a beacon report from the wireless communication station based on the measurement request field.

28. The method of claim 27, wherein the active mode value is to indicate to the wireless communication station to broadcast a probe request.

29. The method of claim 27, wherein the measurement request field comprises a channel number field comprising one octet to indicate a channel for the requested measurement.

30. The method of claim 27, wherein the measurement request field comprises a Basic Service Set Identifier (BSSID) field comprising six octets to indicate a BSSID for the requested measurement.

31. The method of claim 27, wherein the passive mode value comprises a value of "0", the active mode value comprises a value of "1", and the beacon table mode value comprises a value of "2".

32. The method of claim 27, wherein the measurement duration field comprises two octets to indicate the measurement duration in Time Units (TU).

33. The method of claim 27, wherein the measurement request field comprises a zero reporting condition value to indicate transmission of the beacon report after each measurement.

34. The method of claim 27, wherein the measurement request field comprises a non-zero reporting condition value to indicate transmission of the beacon report based on a condition represented by the non-zero reporting condition value.

* * * * *